Dec. 27, 1966 G. POTAPENKO 3,294,480
SYSTEM FOR THE PREVENTION OF THE SPREAD OF INFECTIOUS
DISEASE BY AIRBORNE MICROORGANISMS
Original Filed June 1, 1959 4 Sheets-Sheet 1

FIG. 1.

GENNADY POTAPENKO
*INVENTOR.*

BY Nilsson & Robbins &
Anderson
ATTORNEYS

Dec. 27, 1966  G. POTAPENKO  3,294,480
SYSTEM FOR THE PREVENTION OF THE SPREAD OF INFECTIOUS
DISEASE BY AIRBORNE MICROORGANISMS
Original Filed June 1, 1959  4 Sheets-Sheet 2

GENNADY POTAPENKO
*INVENTOR.*

BY
Nilsson & Robbins &
Anderson  ATTORNEYS

Dec. 27, 1966   G. POTAPENKO   3,294,480
SYSTEM FOR THE PREVENTION OF THE SPREAD OF INFECTIOUS
DISEASE BY AIRBORNE MICROORGANISMS
Original Filed June 1, 1959   4 Sheets-Sheet 3

GENNADY POTAPENKO

INVENTOR.

BY Nilsson & Robbins
Anderson
ATTORNEYS

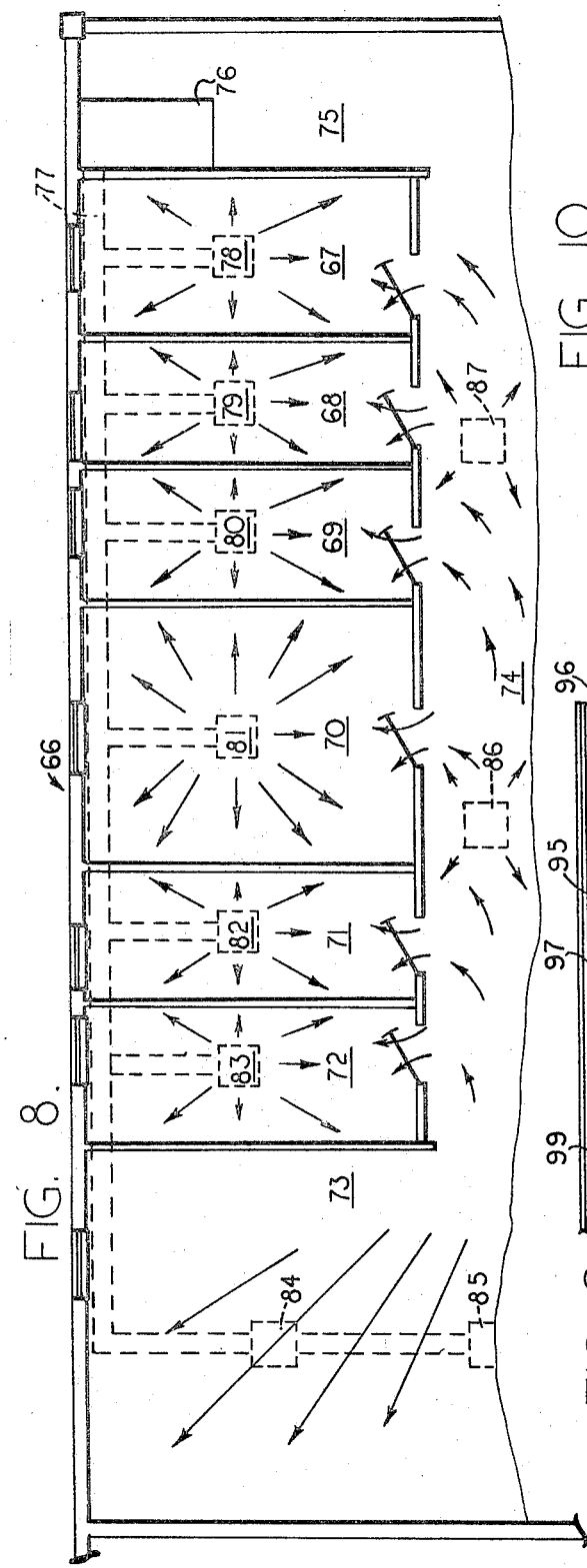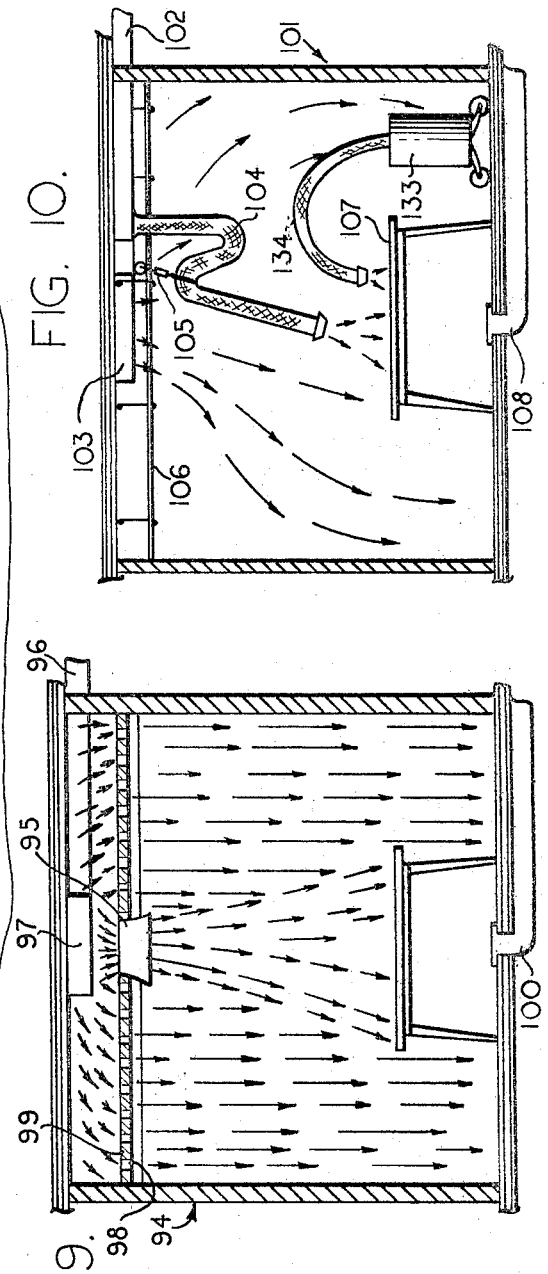
GENNADY POTAPENKO
INVENTOR.

United States Patent Office 3,294,480
Patented Dec. 27, 1966

3,294,480
SYSTEM FOR THE PREVENTION OF THE SPREAD OF INFECTIOUS DISEASE BY AIRBORNE MICROORGANISMS
Gennady Potapenko, Pasadena, Calif., assignor, by mesne assignments, to Union Carbide Corporation, a corporation of New York
Original application June 1, 1959, Ser. No. 817,327, now Patent No. 3,107,974, dated Oct. 22, 1963. Divided and this application July 24, 1963, Ser. No. 297,319
5 Claims. (Cl. 21—74)

This application is a divisional application of Serial No. 817,327, entitled System for the Prevention of the Spread of Infectious Disease by Airborne Microorganisms, filed June 1, 1959, now Patent No. 3,107,974, dated October 22, 1963.

The present invention relates to a system for the asepsis of air. It relates further to such a system for the treatment of air circulating in rooms occupied by human beings and animals and particularly in hospitals, office buildings, residences, factories, bakeries, food plants, etc. for the purpose of removing organisms from such areas and for scrubbing surfaces in such areas which have been contaminated or contacted by contaminated air. It relates further to a system for removing such organisms and for the prevention of the contact of such organisms with human beings.

The problem which has existed in the past is related to the fact that air becomes contaminated with various organisms either through contact with individuals who are infected or who carry these organisms in their respiratory passages as carriers, on clothing, or through contact of air with such patients in hospitals, surgeries, wards, nurseries and other areas. Futhermore it has been found that objects such as bedding, blankets, furniture and the like become carriers through receiving deposited organisms by contact with infected individuals or with contaminated air. This has resulted in the transmission of disease through pathogenic organisms, microorganisms, viruses and the like especially in public buildings, crowded rooms, schools, hospitals, theaters, etc.

In hospitals various infectious organisms such as Staphylococci, Streptococci, TB and many children's diseases are airborne organisms which may be carried from room to room or may lodge on surfaces to become airborne at a later date. This has been found to be responsible for many cases of infection and cross infection in hospitals and for the transmission of disease emanating from other areas such as public buildings, schools, theaters and the like occupied by infected individuals or carriers. There is considerable basis that these facts are responsible for epidemic conditions which frequently occur, and have even been found to be present in hospitals throughout the world. This has been particularly true in the case of Staphylococci. The problem of this disease has received much attention in recent years. This has arisen not only from increasing incidence of small but explosive epidemics in hospitals, but also because there have been indications that these localized outbreaks have been spreading through family contacts in the home and that they may overflow to the community at large. The magnitude of this problem has now been recognized by the medical profession throughout the country. Wentworth, at the 1958 annual meeting of the Society of American Bacteriologists, reported that there had been twenty-two epidemics caused by Staphylococcus over a two-year period in nurseries alone in Ohio hospitals. At the 1958 Veterans' Administration Annual Medical Research Conference it was noted that hospitals had reported from 1.5 to 2 percent of antibiotic resistant Staphylococci in their hospital populations; but this figure rose to a 10 to 12 percent incidence when these hospitals were subjected to a thorough investigation.

The genus Staphylococcus is composed of a number of species, of these, two are involved as human pathogens; namely, *Staphylococcus aureus* and *Staphylococcus albus*. *Staphylococcus aureus* is the species which is primarily responsible for the current problem and this microorganism is the one which is particularly referred to in the remainder of this specification as an example of the manner in which the process and system is carried out, and of the results obtainable with *Staphylococcus aureus* and other microorganisms. The same principles which are discussed herein are applicable not only to Staphylococcus, but also to any airborne infectious disease whether it is bacterial, viral or fungal.

Various studies have indicated that when the population as a whole was surveyed with a single test, 20 to 50 percent of the individuals were found to be carriers of Staphylococcus. If more than one test was performed the frequency of carriers increased to 70 percent or more. The bacteria occurred in the nose, nasopharynx, mouth, and on the skin, in the order of decreasing frequency. More than 90 percent of the persons with Staphylococci on their skin also had these microorganisms in the nose, indicating that occurrence on the skin is secondary to that in the nasal passages.

The single species *Staphylococcus aureus* has been separated into a number of strains on the basis of susceptibility to lysis by various Staphylococcus bacteriophages. The phage susceptibility pattern is a very stable characteristic and with this technique it has been possible to trace the source of particular strains of this microorganism.

With the use of these bacteriophages, it has been shown that the strains of *Staphylococcus aureus* fall into four major groups, and that the strains within each of these groups have certain other properties in common; for example, most of the strains responsible for the epidemics are in Group III, and the greatest majority of antibiotic resistant Staphylococci isolated in hospitals fall into this group also. In extensive studies of the epidemiology of phage-typed Staphylococci, it was found that strains of *Staphylococcus aureus* isolated from the general population were distributed proportionately among all four phage groups. In hospital personnel, however, the majority of strains isolated were of the Group III type. Furthermore, the pattern changed in patients hospitalized for one week or more from a random distribution of phage types, as in the general population, to the distribution characteristic of hospital personnel; that is, a predominance of Group III strains.

It would appear, therefore, that a major source of all four types of Staphylococci has been the human carrier, and that these microorganisms have been endemic throughout the population. Superimposed upon this basis, there has been a concentration in the hospitals of a potentially epidemic type of *Staphylococcus aureus*. It is very unlikely that the human race will ever be rid of Staphylococcus, although the Staphylococcus problem will be brought under control.

Since the primary source of *Staphylococcus aureus* has been the nose of the human being, the principles of aerosol dissemination and droplet nuclei infection are applicable. These principles have been discussed thoroughly by W. F. Wells in his book, "Airborne Contagion and Air Hygiene."

In the process of sneezing, coughing, and even talking, humans expel thousand of droplets of moisture from their nose and mouth. These droplets contain, among other foreign materials, microorganisms indigenous to these sites. The droplets generally vary in size from approximately 10 microns to approximately 10 millimicrons in diameter. All of these droplets begin to evaporate when they are exposed to the air, more or less quickly depending upon the degree of humidity prevailing. The larger droplets reach the ground or floor to dry up as dust, but the smaller ones evaporate completely leaving in the air the so-called "droplet nuclei" which consist of microorganisms, and of various salts contained in the droplets expelled. The nuclei remain suspended in the air to drift and circulate with air currents much as cigarette smoke does. The aerodynamic characteristics of these droplet nuclei is such that they remain suspended indefinitely. A large proportion of these droplet nuclei are less than 5 microns in diameter, many of them being only 1 micron or less. When a human breathes air containing these droplet nuclei, those larger than 5 microns in diameter are trapped in the nasal passages, while those of 1 micron or less can reach the innermost parts of the lungs. In addition, traumatized tissues, for example, those present during and following surgery, may be exposed not only to these droplet nuclei, but also to Staphylococci present in larger droplets and in settling dust.

There are, threfore, two airborne modes of spreading Staphylococci, both originating with the dissemination of these bacteria into the air by humans. In one case, the Staphylococci settle out of the air onto all exposed surfaces, and remain limited in spread to the extent that dust control measures are more or less effective. In the second case, the Staphylococci remain suspended in the air in droplet nuclei, and may spread to any area depending upon the pattern of air circulation and ventilation.

Since it is not possible to eliminate *Staphylococcus aureus* from the environment of the human, and since there is a concentration of potentially epidemic types of this microorganism in hospitals, it is necessary for the hospital to resort to prophylactic measures to prevent epidemic outbreaks. These measures must be capable of controlling both pathways by which these bacteria can disseminate; through contact with fomites and through aerial dispersion.

Applicant has discovered that infection and cross infection by airborne microorganisms can be greatly reduced or prevented by providing for the circulation and/or recirculation of sterilized air through a desired area such as a room or number of rooms in such a manner that the pressure in any given enclosed space where such results are desired is moved at a pressure differential which is greater or lower depending upon the conditions which it is desired to prevent. Thus in areas where it is desired to remove contaminated air and at the same time to prevent the entry of contaminating air, sterilized air is circulated through such areas and these areas are maintained at a positive pressure with respect to an external area whereby sterilization takes place of the air recirculated within the area while the entry of contaminated air is thereby prevented. On the other hand in contagious areas, for example in hospital rooms or wards containing highly infectious patients, sterilized air is recirculated within such areas but at a lower pressure than an external area whereby potentially contaminated air within the area is prevented from escaping therefrom by maintaining a negative pressure differential between such area and the exterior.

The system described herein preferably utilizes an air sterilizing device of the type described in United States Patent Number 3,011,230. This device provides for the destruction of airborne organisms contained in a flowing air stream by subjecting such streams to high intensity ultraviolet radiation at very close range. The irradiation occurs in a chamber or duct in which is positioned a cylindrical tube with an inner surface which is highly reflective for radiation in the germicidal range. Inside of the tube is a baffle system which produces turbulence and directs the air flow in a cyclonic pattern to insure complete exposure of all airborne particles to the lethal rays which emanate from the ultraviolet generator. This generator or tube extends longitudinally through the core of the chamber. In a typical unit of this type, for example, one such chamber operating at an air flow of 100 cubic feet per minute may kill in excess of 99.9 percent of microroganisms in a single passage. The device described eliminates the disadvantages of previous exposed ultraviolet techniques for the control of airborne microorganisms. The device in question is based upon the fact that the effectiveness of radiation in free air is inversely proportional to the square of the distance of the target from the source of germicidal energy and is a direct function of time and exposure. Design of the sterilizing unit referred to insures that no microorganism passing through the chamber is more than three inches from the ultraviolet tube. In comparison, an exposed tube, used in the conventional manner, may be required to disinfect areas at a distance of several feet. Even at a distance of four feet such a tube would exert approximately $\frac{1}{256}$ of the effect of the tube in the apparatus described in the above-mentioned application. The short working distance provided for permits shorter exposure time and allows for a high rate of air flow.

In accordance with the present invention a desired number of units of the type described above are installed in a system in which the circulation and recirculation of sterilized air as well as contaminated air is controlled with respect to patterns of circulation, pressure differential, and similar factors in order to achieve desired results for given areas. Thus in rooms or buildings the system described herein is designed to insure continuous recirculation of room air so that contamination introduced into the atmosphere will be exposed to the ultraviolet radiation within the chambers of the sterilizing unit in a minimum of time after introduction into the atmosphere. In addition means are provided for focusing air directly in predetermined areas, for example, in a surgical area, focused air may be directed downward above the operating table encompassing the surgical area of the patient thereby eliminating the entry of airborne microorganisms into traumatized tissues.

The system described herein is very flexible and can be adapted to any air decontamination problem, from that of the air surrounding exposed skin areas undergoing minor surgery, to the atmosphere of an entire hospital or other building. It can be applied to disinfection of outside air entering a building or room, exhaust air from contaminated areas, and the recirculation of air within a building. The size of the sterilizing unit will vary, depending upon the size of the installation. Certain applications may require anywhere from a single unit to banks of multiple chambers. The system may be incorporated into the air conditioning system of hospitals, clinics and medical suites as well as offices, schools and other buildings. The recirculation of air decontaminated by the sterilizing unit described, reduces the volume of outside air which must be introduced and thus permits the installation of an air conditioning and heating plant of lesser capacity than heretofore deemed possible.

The units described are designed to be installed to decontaminate entire hospitals or sub-units within a building. In non-infectious areas such as surgeries, nurseries, non-infectious wards and rooms, slight positive pressures are maintained to prevent entry of contaminated air from other hospital areas. In infectious disease areas the need is to prevent escape of infectious organisms into the general air circulation of the hospital. This is achieved by maintaining a slight negative pressure so that there is no leakage of contaminated air into surrounding corridors. These areas include infectious disease wards and rooms, laboratories, waiting rooms, and outpatient facilities.

Additional objects and advantages of the system of the present invention will become apparent from a consideration of the following description taken in conjunction with the accompanying drawings which are presented by way of example only and are not intended as a limitation upon the scope of the present invention as defined in the appended claims, and in which:

FIG. 1 is a top plan view illustrating the system as applied to a floor or group of rooms in a hospital or other building;

FIG. 2 is a side plan view partly in cross section illustrating the system shown in FIG. 1 taken along lines 2—2 thereof;

FIG. 4 is a perspective view partly in cross section illustrating an individual sterilizing unit in a room;

FIG. 5 is a side plan view partly in elevation and partly in cross section illustrating another modification of the invention as applied to a different type of room installation;

FIG. 8 is a view of the system as applied to a group of rooms in a hospital or the like in which a negative pressure differential is utilized;

FIG. 9 is a vertical transverse view partly in cross section and partly in elevation illustrating the system of the invention as applied to a surgical operating room; and FIG. 10 is a further modification of the invention as applied to surgical operating rooms.

Figure 6:
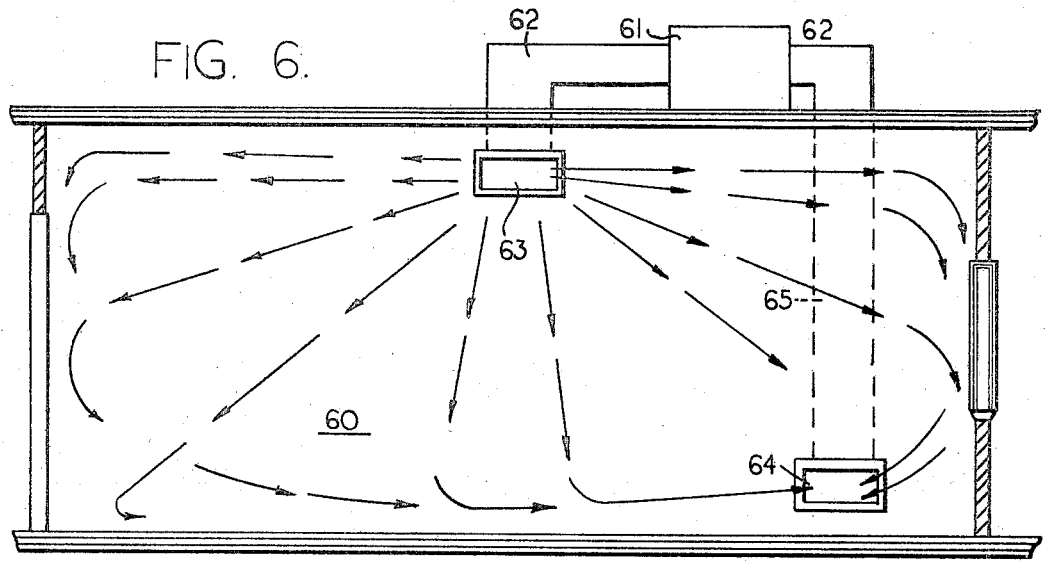
FIG. 6 is a transverse view partly in cross section and partly in elevation illustrating a further modification of this system as applied to another type of room installation.

Referring now to the drawings and more particularly to FIG. 1, there is shown a group of rooms 20 which may represent any area such as a ward or the entire floor of a hospital or other building. The area is provided with corridors 21 and 22 and rooms 23 to 34 inclusive. A central air sterilizing unit 35 is provided which is composed of a multiple bank of sterilizing members of the type described above, such as illustrated for example in FIG. 3 and discussed further below. This unit is connected to a central duct 36 which may also be connected to a central air conditioning or heating system with the sterilizing unit 35 being connected into the system so that recirculated air passes through the sterilizing unit 35 before entering the central duct 36. Fresh air may be introduced either into the air conditioning or heating system or from a separate inlet into the sterilizing unit 35 as desired. At the same time, the desired proportion of air from the area is recirculated through the sterilizing unit 35, with part thereof being expelled to the atmosphere in proportion to fresh air admitted. The central duct 36 is connected by means of a plurality of feeder ducts 37 to 45 inclusive to a plurality of distributor members 46 to 54 inclusive. The various ducts may be located above the ceiling or along the ceiling if desired while the distributor members may be in the form of baffled ceiling outlets which are designed to direct air along the ceiling toward the walls. The air is then returned and recirculated through the sterilizing unit 35 or to the outside atmosphere if desired by means of return ducts which may be located beneath the floor or adjacent thereto as illustrated more particularly in FIG. 2. Similar ceiling distributing members 55 and 56 may also be interconnected through the central duct 36 for the circulation of sterilized air through the corridor into which the respective rooms referred to lead. Air is circulated through the sterilizing unit 35 and then into each of the rooms interconnected therewith in such a manner that a slight super-atmospheric pressure is maintained in each room. The amount of pressure in each room is controlled by regulating the rate of air flow and the rate of withdrawal therefrom so that the desired degree of atmospheric pressure is maintained. Such pressure is preferably between approximately $\frac{1}{10}$ of one inch of water and $\frac{1}{1000}$ of one inch of water above atmospheric. On the other hand the pressure in the corridors with which the rooms communicate is maintained at atmospheric pressure or at a slightly lower pressure so that a pressure differential within the above indicated limits is maintained whereby contaminated air which might otherwise enter into these rooms from the corridor or from other rooms cannot do so. Control means effective to carry out such pressure difference control is well known, such as, for example, that shown in United States Patent 2,282,-210. On the other side of the corridor rooms 30, 31 and 32 may, if desired, be interconnected with the same system or may be connected to a separate system, or to individual ceiling units connected to air distributors 30a, 31a and 32a.

Rooms 33 and 34 are illustrative of the fact that the rooms may contain individual recirculating units.

As shown in FIG. 4 room 33 is provided with an individual console type of unit 58 which contains one or more sterilizing units of the type described in the aforesaid copending application. The air is circulated throughout the room 33 in the manner shown by the arrows so that sterilized air is introduced against the wall, flows over the ceiling, downwardly to the floor and is withdrawn adjacent the floor for resterilization and recirculation. Fresh air may be metered in, in a controlled manner, by means of inlet ducts (not shown) connecting either to the outside or to the central air conditioning system, while stale contaminated air may be withdrawn from the room in a controlled manner through additional ducts (not shown). The pressure within the room 33 is maintained at a slight superatmospheric pressure by controlling the amount of air introduced and withdrawn in the same manner as above described. A similar type of wall console unit is illustrated at 59, FIG. 1, as installed in room 34, in this case against another wall of the room.

As above indicated, the area adjacent the pressurized areas may be non-pressurized, that is, maintained at atmospheric pressure, the principle of differential pressure being effective in this case, as well.

Figure 7:
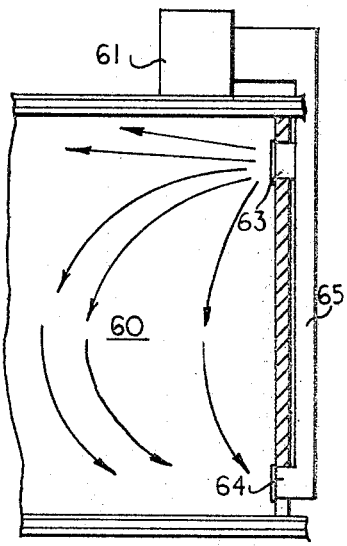
FIG. 7 is another view of the system as illustrated in FIG. 6.

Another type of individual room unit is illustrated in FIG. 6 and FIG. 7. In this case room 60 is provided with an individual sterilizing unit 61 positioned above the ceiling of the room. Duct 62 communicates with an outlet means 63 which is baffled to direct the sterilized air along the ceiling to the walls, and downwardly along the walls to the floor and along the floor to the outlet means 64. The air which is removed through outlet means 64 is recirculated through duct 65 to the sterilizing unit. Fresh air may be introduced and stale air removed by additional inlet and outlet ducts not shown. Where contaminated stale air is removed from the hospital or other sterilized area it may be passed through a separate sterilizer of this or other type in order to prevent escape of infectious microorganisms. The inlet and outlet ducts may be connected directly to the room or may be connected into the duct system of the unit. The desired pressure differential may be maintained in the same manner as described above.

As shown in FIG. 5 another modified room installation is illustrated in which room 88 is provided with inlet duct 89 and connected to a sterilizing unit, and a distributing member 90 which is positioned between the true ceiling of a room and a false ceiling which consists of a plenum 91 provided with a plurality of small openings 92 distributed thereover. This is for the purpose of insuring the distribution of a multiplicity of relatively slow air streams downwardly through the openings so as to minimize or eliminate any rapid or localized circulation in any room. This circulation is illustrated by the arrows. The air which is circulated above the plenum is distributed thereover in such a manner that the velocity of any individual air stream downward is reduced to a low level.

Figure 3A:
FIGS. 3a, 3b and 3c are perspective fragmentary views showing alternative arrangements of tube enclosures for the sterilizing unit.
Figure 3B:
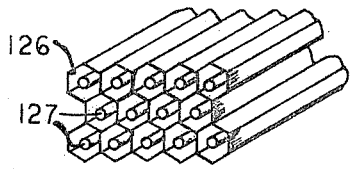
Figure 3:
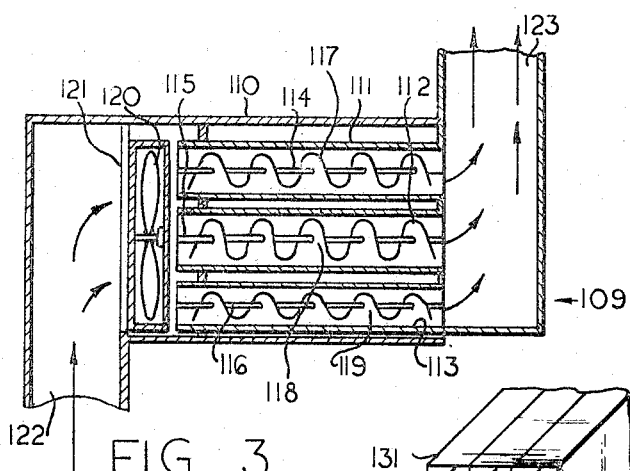
FIG. 3 is a side plan view partly in elevation and partly in cross section illustrating a typical sterilizing unit.

This eliminates turbulence but still provides a positive circulation of air in a downward direction toward the floor creating a protective curtain between persons and sweeps the microorganisms downward to the floor preventing horizontal drift or movement of droplet nuclei or dust. Contaminated air is withdrawn adjacent the floor through one or more ducts 93 and recirculated for resterilization or exhausted to the exterior. The size of the openings regulate the velocity of any individual air stream and preferably the openings may range in diameter from as low as $\frac{1}{16}$ inch to as high as one inch or more in diameter. The openings may be of different size and shape and may be in the form of circular or rectangular openings, or may be narrow slits. The number and distribution of the openings are selected to give the desired air patterns.

FIG. 8 illustrates the reverse of the system described in FIGS. 1 and 2 in which the individual areas are of an infectious nature, and in which a positive pressure differential with respect to these areas is maintained by maintaining a higher pressure in the outer areas than within the room. The magnitude of the pressure differential may correspond to that described above. As shown, hospital area 66 is composed of a number of rooms 67 to 73, inclusive, and corridors 74 and 75. A sterilizing unit 76 is connected to these areas by means of ducts 77, leading to ceiling air distributors 78 to 87 inclusive which distribute the sterilized air in the manner described in connection with FIGS. 1 and 2. A negative pressure differential is maintained in the rooms with respect to that in the halls or corridors, so that when the doors are opened, air in these rooms cannot escape, the path of flow being that illustrated by the arrows. The pressure differential is of the order described above, but is reversed as described. It is achieved by providing for a greater air flow in the halls and corridors than is removed therefrom. At the same time, the sterilized air circulates through the rooms to sweep out and recirculate contaminated air through the sterilizing unit through return ducts (not shown).

FIG. 9 illustrates a further modification of the circulatory system described in FIG. 5 as applied to a surgical operating room 94, whereby in addition to minimizing the circulation of air over the major area of the room an additional zone of greater and more rapid circulation is provided in the area directly above the operating table by providing for an enlarged opening 95 in this area or in any other area where such rapid circulation is desired. As shown, sterilized air is introduced through duct 96 to distributor 97. The air flows into the room through openings 98 in a plenum or false ceiling 99 as described in connection with FIG. 5. The aseptic air is forced downward, bearing with it any contaminating organism, and is removed through outlet duct 100 for resterilization or the like. At the same time, the operating zone is swept free of organisms and access thereto prevented by the greater volume of air introduced through enlarged opening 95, as illustrated by the arrows. The openings may be of varying diameters in those ceiling areas where a greater volume of air flow is desired. This is particularly true in the corners of the room where one or more of the openings may be larger to increase the air flow in these areas. The increase in diameter need not be great since the volume of air flow increases as the fourth power of the diameter.

Still another modification is illustrated in FIG. 10 in which a tubular member is shown connected to the duct which introduces the sterilized air so that in addition to the sterilized air being introduced throughout the room through the central distributor a concentrated stream of sterilized air may be directed through the duct against any given area during an operation. As shown room 101, which may be a surgery or the like, is provided with a ceiling inlet duct 102 for sterilized or aseptic air from a central unit, or from a separate ceiling unit. The air is distributed along the ceiling and downwardly by a vaned distributor member 103. A semi-flexible hose or similar conduit 104 which may be of any desired diameter, such as 2 inches or larger, is connected into the duct 102 and is suspended by member 105 from a wheel or guide which operates on a track 106. Thus the outlet of 104 which may include a dispensing member may be laterally adjustable with respect to an operating table 107. In this way, in addition to the stream of aseptic air flowing downwardly and out through duct 108, a more concentrated stream of greater velocity may be directed against an operating area to prevent access of contaminating bacteria and to sweep that area clean during the operation. In lieu of or in addition to conduit 104, a portable unit 133 may be utilized. This unit is self-contained and contains an ultraviolet air sterilizing device of the type shown in the aforesaid prior application, with air inlet and outlet and recirculation means, mounted on wheels or casters. To the unit is attached a duct 134, which may be flexible so that the unit may be moved to the desired position and the duct focused over the operating area on the table.

In lieu of a ceiling attached focused air unit, the same principle can be applied by means of a portable unit having a duct attached adapted to direct air downwardly into the operating zone, in which a sterilizing unit is incorporated to pick up contaminated air and sterilize it prior to entering the duct.

As shown in FIG. 3, the sterilizing unit which is preferably utilized comprises a plurality of cylindrical chambers each of which contains an ultraviolet ray tube concentric therewith, the tubes being surrounded by a helical baffle which circulates the air to be sterilized around the tube in a helical path. Instead of a helical baffle, the air may be introduced tangentially or by using baffles at the inlet so that a whirling path is described inside of the chamber. The unit 109 illustrated by way of example in FIG. 3 comprises an enclosure 110, within which are positioned a plurality of cylindrical chambers 111, 112, and 113. Corresponding chambers are provided in alignment with these to provide a multiple bank. The chambers are open at each end and are positioned horizontally as shown. They may also be positioned vertically or at an angle. Ultraviolet generating tubes 114, 115 and 116 of known types such as the GE 36 T6, or other types depending on length and wattage desired are positioned within these chambers longitudinally concentric therewith. These tubes are surrounded by helical baffles 117, 118 and 119, passing through openings centrally of the baffles. Air is forced through the cylinders and in contact with the tubes by means of fan 120 which forces the air through a filter 121. The air is introduced through inlet duct 122 which is connected to a return duct for recirculated air from the rooms or other areas and may also be connected to air coming from a central heating and/or air conditioning system into which both fresh outside air and recirculated air have been introduced. The sterilized air leaves the chamber through duct 123 whence it is conducted to ducts leading to respective rooms or other areas where the sterilized aseptic air is to be introduced and circulated in the manner described above. Instead of cylindrical chambers surrounding the tubes, they may be rectangular or other cross section, although cylindrical configuration is preferred. Other arrangements may consist of ultraviolet tubes inserted concentrically in a honeycomb structure, the walls of which surround the tube. In general the objective is to provide a multiple bank of sterilizing tubes, each of which is surrounded by a tubular reflector member which at the same time isolates the ultraviolet tube from those adjacent in order to ensure a short effective radiation path for the irradiation of microorganisms. Although this is preferred, it is possible to utilize a multiple bank of ultraviolet tubes, without individual shields, and enclose the tubes in a single chamber. This is less efficient due partly to the phenomenon of absorption of the radiation emitted by one tube, by other tubes adjacent thereto. This result may be obtained, for example, by utilizing the structure of FIG. 3, omitting the helical baffles and tubular members surrounding the tubes.

Figure 3C:
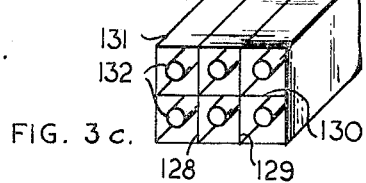

Other multiple tube arrangements are illustrated in FIGS. 3a, 3b and 3c. As shown in FIG. 3a a plurality of cylindrical sleeves 124 are arranged longitudinally in an adjacent staggered manner as shown, each with an ultraviolet ray tube positioned concentrically therein. In FIG. 3b, a plurality of sleeves in the form of hexagonal cells 126 arranged in a honeycomb structure may be provided as shown, each with an ultraviolet tube 127 arranged longitudinally therein. This provides a staggered relationship of the cells. In FIG. 3c, a plurality of cells or compartments is provided by arranging a plurality of partitions 128, 129, 130 in an enclosure 131 in such a manner that a number of cells or compartments of rectangular cross section is provided. Each of these is provided with an ultraviolet tube positioned longitudinally thereof. The above arrangements may be utilized instead of that shown in FIG. 3, each compartment being provided with a helical baffle if desired, and each open at both ends to permit passage of air to be sterilized around the tubes. The helical baffles are preferably arranged so that the tube passes concentrically through central openings in the baffles with a small space being provided between the tube and the edges of the openings to ensure axial flow of air as well as helical flow.

The downward vertical flow of aseptic air, as illustrated particularly in FIGS. 5 and 9 provides a barrier or "curtain" of such air between individuals who may be in the room or between individuals and sources of infection, thus serving to prevent infection or cross infection by interposing such a flowing barrier and carrying bacteria downwardly toward the floor being removed from this area for recirculation and resterilization.

There has thus been disclosed several embodiments of a system for sterilizing air thereby to prevent the spread of airborne microorganisms thus controlling and eliminating the spread of infectious diseases. Although several specific embodiments of the system have been illustrated and described, it should be expressly understood that the scope of the present invention is to be determined only by the appended claims.

What is claimed is:

1. A system for preventing the spread of infectious microorganisms from a first substantially enclosed area to a second adjacent substantially enclosed area, each of which is adapted for human habitation, said system comprising: fluid sterilizing means; fluid conducting means interconnecting said fluid sterilizing means and said enclosed areas; fluid distributing means within each of said areas and connected to said fluid conducting means for receiving fluid from said fluid sterilizing means and distributing said fluid within said areas; fluid removal means within each of said areas for removing fluid therefrom; fluid circulating means connected for moving fluid through said system; and control means within each of said areas for maintaining a pressure difference between said areas, said control means regulating the proportions of fluid received by and removed from each of said areas in response to variations in said pressure difference between said areas to maintain said pressure difference at a predetermined value.

2. A system as defined in claim 1 in which said sterilizing means is a plurality of ultraviolet tubes each of which is surrounded by a chamber and said chambers are disposed side by side.

3. A system for preventing the spread of infectious microorganisms from a first substantially enclosed area to a second adjacent substantially enclosed area, each of which is adapted for human habitation, said system comprising: fluid sterilizing means; fluid conducting means interconnecting said fluid sterilizing means and said enclosed areas; fluid distributing means within each of said areas including a plenum in at least one of said areas defined by a false ceiling spaced from the ceiling in said area and coextensive therewith and having a plurality of openings therethrough for receiving fluid from said fluid sterilizing means and distributing said fluid within said area; said distributing means further including in said one area a tubular member of restricted diameter connected to said plenum and receiving fluid from the same source as said plenum and having an open end extending into said one area; means interconnecting said plenum to said sterilizing means; fluid removal means within each of said areas for removing fluid therefrom; fluid circulating means connected for moving fluid through said system; and control means within each of said areas for independently regulating the proportions of fluid received by and removed from each of said areas thereby to establish a pressure difference between said areas.

4. A system as defined in claim 3 in which said tubular member is flexible to enable said open end thereof to be located to a desired point within said area.

5. A system for preventing the spread of infectious microorganisms from a first substantially enclosed area to a second adjacent substantially enclosed area, each of which is adapted for human habitation, said system comprising: fluid sterilizing means; fluid conducting means interconnecting said fluid sterilizing means and said enclosed areas; a plenum in at least one of said areas defined by a false ceiling spaced from the ceiling in said area and coextensive therewith and having a plurality of openings therethrough, one of said openings being several times larger than the remainder for conducting a concentrated large volume stream of high velocity fluid into said area, the volume and velocity of said stream being greater than that flowing through any of said remainder of said openings; said fluid conducting means being connected to said plenum; fluid removal means within each of said areas for removing fluid therefrom; fluid circulating means connected for moving fluid through said system; and control means within each of said areas for independently regulating the proportions of fluid received by and removed from each of said areas thereby to establish a pressure difference between said areas.

References Cited by the Examiner

UNITED STATES PATENTS

| | | | |
|---|---|---|---|
| 441,573 | 11/1890 | MacDonald | 21—53 |
| 1,107,745 | 8/1914 | Batter | 98—33 |
| 1,518,162 | 12/1924 | Parkinson. | |
| 1,773,220 | 8/1930 | Credicott. | |
| 2,150,263 | 3/1939 | Chesney | 21—74 X |
| 2,183,387 | 12/1939 | Anderson | 21—74 X |
| 2,198,867 | 4/1940 | Fair et al. | |
| 2,265,367 | 12/1941 | Hartman | 21—74 X |
| 2,282,210 | 5/1942 | Plum | 98—1.5 |
| 2,348,486 | 5/1944 | McCrosson | 21—74 |
| 2,359,021 | 9/1944 | Campbell et al. | 21—74 X |
| 2,523,373 | 9/1950 | Jennings et al. | 21—74 |
| 2,533,690 | 12/1950 | Raider | 21—74 |

MORRIS O. WOLK, *Primary Examiner.*

J. T. ZATARGA, *Assistant Examiner.*